Figure 1:
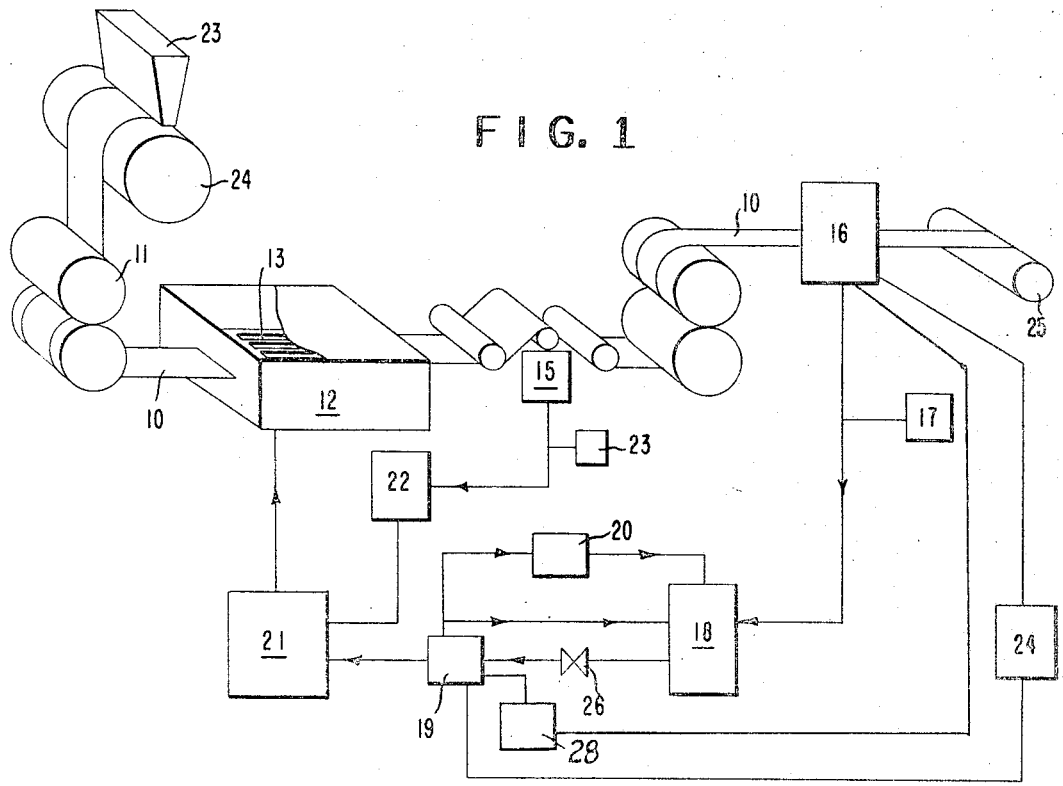

INVENTOR
THOMAS D. FENLEY

United States Patent Office 3,347,960
Patented Oct. 17, 1967

3,347,960
PROCESS AND APPARATUS FOR CONTROLLED PREPARATION OF A WEB
Thomas D. Fenley, Hightstown, N.J., assignor to E. I. du Pont de Nemours and Company, Wilmington, Del., a corporation of Delaware
Filed May 20, 1964, Ser. No. 368,813
7 Claims. (Cl. 264—40)

This invention relates to an apparatus for stretching a web material. More particularly, this invention relates to apparatus for governing the uniformity of the transverse thickness of a polymeric web during web orientation.

In order to obtain the proper molecular orientation in the manufacture of films and webs of long-chain polymers, such as polyesters, nylons, polypropylenes, etc., it is necessary to stretch the web in the longitudinal direction and again in a transverse direction at elevated temperatures. In the longitudinal stretching operation, the web is heated by an array of radiant heaters and stretched between two pairs of nip rolls. The first pair is called the hold-back rolls and the second pair the pull-rolls. The amount of stretching in the longitudinal direction is controlled by controlling the ratio of the speed between the pull rolls and the holdback rolls. In the transverse stretching operation, the web may be stretched laterally by use of two rolls of guide rollers such as described in Alles et al. 2,728,941. In most biaxial processes the heating unit for either stretcher is composed of a number of radiant heaters spaced transversely across the web. The total amount of heat from the heaters determines the stretching force required and the relative amount of heat applied to each transverse zone of the web by the individual heater affects the relative thickness of the web in that zone.

During the manufacture of these webs of long-chain polymers excessive variations in the thickness of the orientated web have caused high yield losses. Various methods have been used to correct this variation, such as adjusting the lips of the hopper or adjusting the heaters in the various zones. In carrying out these methods, the thickness profile of a sample cut from the web at wind-up is examined and either the heaters or hopper lips are manually adjusted. This requires operators skilled in the function of the equipment, in casting and stretching theory, and also there is a long time lapse between the stretching and the correction. Additionally the sample cut is not indicative of the average lateral gauge profile because of gauge variations in the longitudinal direction that are repetitive with each casting wheel revolution. Thus, because of these factors, a considerable amount of inferior web can be manufactured before satisfactory adjustments can be made.

It is an object of this invention to provide an apparatus to regulate the total heat acting upon the entire lateral width of a web while also regulating the effects of a segment of said heat upon a corresponding segment of the web. A further object is to provide an apparatus for regulating the preparation of a web product whereby the quality of individual segments of the web are governed as well as the over-all quality of the entire web. Another object is to provide an apparatus for producing a web having improved lateral thickness qualities by coordinated heating and stretching of the web. Other objects will appear hereinafter.

These and other objects are accomplished by an apparatus for preparing web material comprising (A) means for stretching said material;
(B) heating means having a plurality of heaters for softening said material;
(C) tension control means for measuring said web tension as it is stretched and signalling any difference in a comparison of said measurement with a pre-selected signal for the desired tension;
(D) a web thickness detector for repeatedly scanning across said web by segments, said segments corresponding to a portion of the web width being effected by one of said heaters;
(E) control means responsive to a signal from said thickness detector for a designated web segment whereby said control compares said signal with a reference signal to form a correction signal for said designated web segment; and
(F) actuating means for said heaters whereby a signal from said tension means will uniformly change the output of all of said heaters and a signal from said control means will change the output of only said heater corresponding to said web segment being measured.

This invention is particularly useful in the orientation of a web of polyethylene terephthalate photographic film base by stretching such as described in Alles et al. 2,627,088 and Alles 2,779,684, and is disclosed below in an examplary embodiment.

Figure 2:
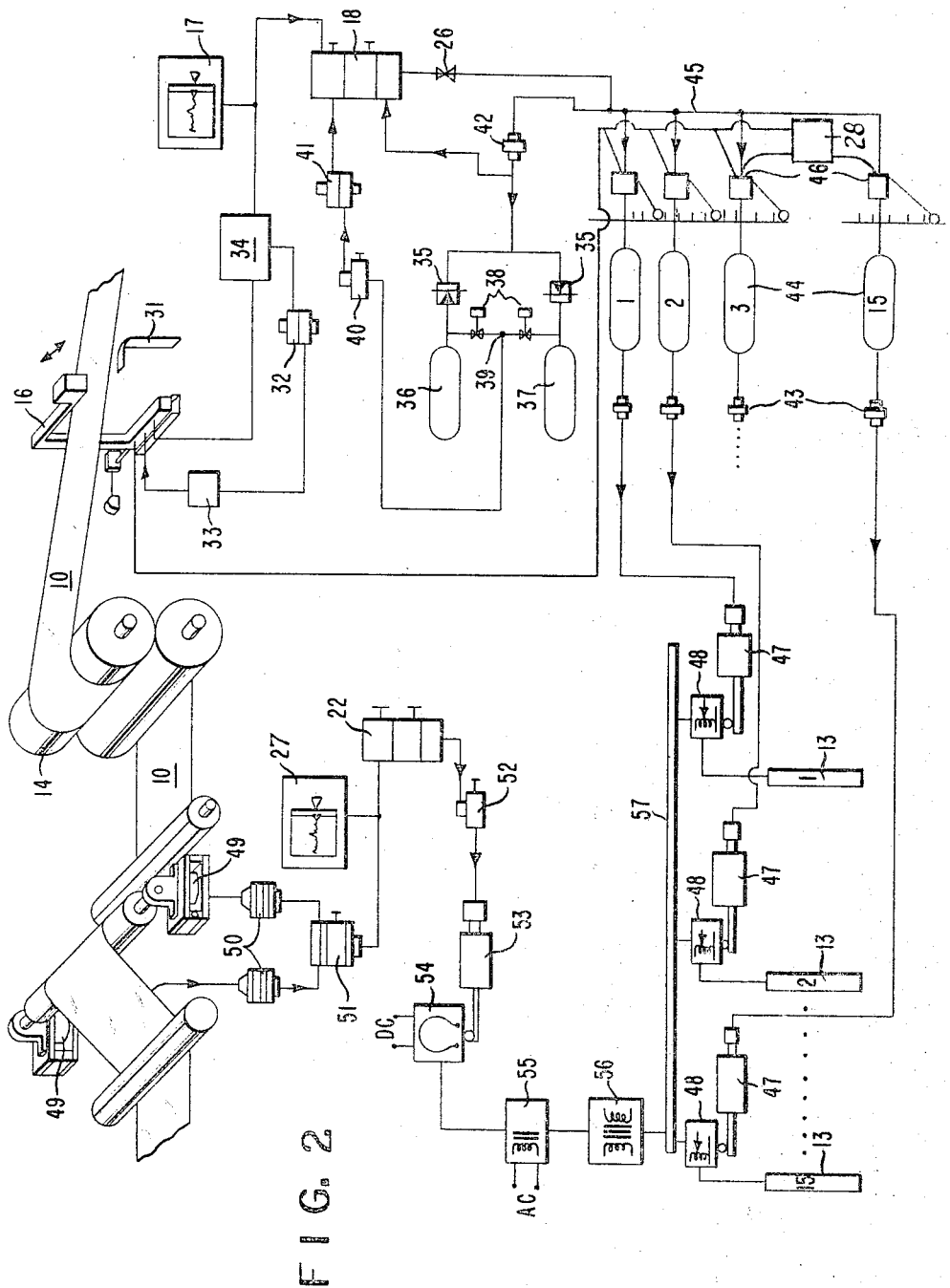
Figure 3:
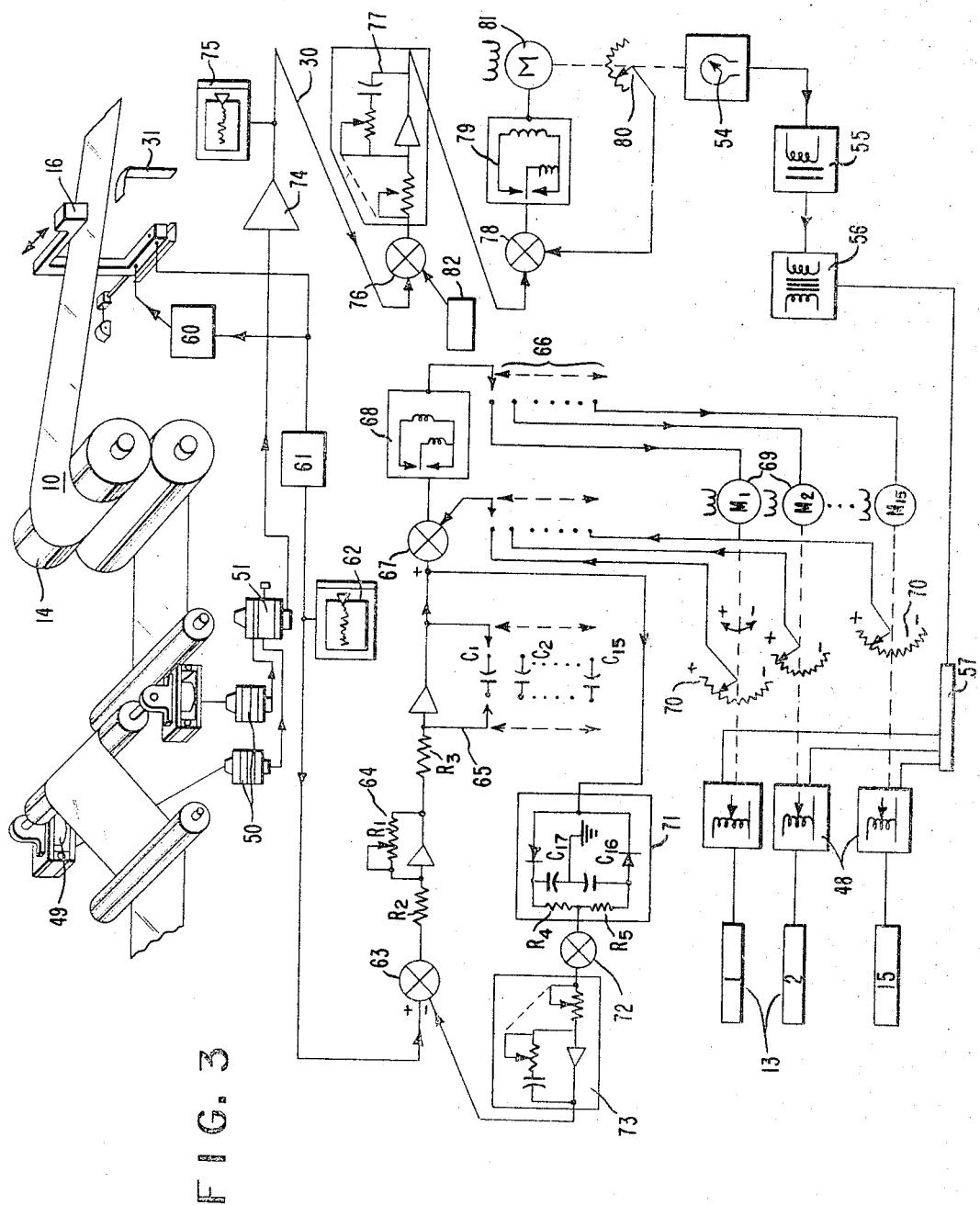

FIG. 1 is a block diagram illustrating the functional relationship of the basic elements of this invention.
FIG. 2 is a schematic diagram of this invention using pneumatic control means.
FIG. 3 is a schematic diagram of this invention using electronic control means.

Referring to FIG. 1, in the manufacture of thermoplastic materials, a web of polymer 10 i.e., polyethylene terephthalate is continuously cast from hopper 23 onto a cooled casting wheel 24 and subsequently passed between the nip in a pair of hold back rolls 11. The web then passes through a heating unit 12 which is composed of a plurality of radiant heaters 13. Each heater is located parallel to the web movement and they are placed side by side to form a series of heaters across the web in a position transverse to the line of web movement. After passing through the heater the web is stretched by the pull rolls 14. These rolls move at a greater speed than the hold back rolls and the difference in speed coupled with the heating of the web produces the stretching in the longitudinal direction. After completion of the web processing, the web is rewound on rewind roll 25. The disclosed embodiment of the apparatus of this invention is concerned with the longitudinal stretching of a web. However, similar results can be obtained by arranging the heaters before stretching the web in a transverse direction. The transverse can be accomplished as disclosed in U.S. Patent 2,728,941. Thus, the over-all thickness as well as individual web segment thickness can be governed during longitudinal and transverse stretching.

A measuring or sensing means 15 is placed before the pull rolls and measures the tension or the total stretching force in the web during the stretching operation. After passing through the pull rolls the web passes through a web thickness measuring means 16. This device measures the thickness of the web in a longitudinal zone corresponding to the area in the web heated by one of the individual heaters 13. The thickness in a particular zone is measured for a length of time equal to one revolution of the casting wheel 24 upon which the web is originally formed. After measuring one zone this device progresses transversely to scan the next zone and continues this transverse progression of scanning until the zone corresponding to each heater has been examined. The device then returns to the first zone scanned and continues to scan in a repeating sequence. The thickness measurer transmits a signal which represents the thickness in the particular zone being scanned and this signal is called the primary feedback. The primary feedback is sent on to a controller 18 and can also be kept on a recorder 17.

The controller, in analog fashion computes an actuating signal for each zone based upon the time integral of a differential signal representing the difference between the thickness of the web for the zone which has just been measured and a reference signal for that zone. To perform this function the controller compares the primary feedback signal with a reference input signal, amplifies the difference, adds a memory circuit feedback signal for a constant of integration and transmits the resulting signal through a restriction 26 which serves to integrate with respect to time the algebraic sum of the signals.

The memory circuit feedback signal, or secondary feedback, is the stored signal from the memory circuit 19 for the zone being scanned and also represents the signal transmitted to the final control element, (e. g., heater) for that zone during the prior scan of that zone. The feedback is sent to the controller in synchronization with the sensing of the thickness of the particular zone involved. This memory feedback permits the controller to produce an output signal equal to the memory signal for that particular zone when there is no error in thickness represented in the primary feedback.

The reference input signal is determined by a circuit 20 that can be called the set point circuit. This circuit has two functions, first, to keep the reference input representative of the average thickness and second, to keep the final control elements centered within the limits of their travel. The latter function is of particular importance where the final control element involves apparatus using an auto transformer and its movement to either of the end positions would discontinue the correcting action of the final control element. This circuit receives and stores two signals, one representing the largest signal in the system and the other the smallest. The two signals are averaged and the resulting signal is compared to a signal for a fixed force representing the center of the action of the final control element. The difference is integrated over time and represents the reference input signal.

The memory circuit 19 stores the signals that represent the heat required for each zone. Each individual heater in the heating unit 12 has a storage chamber to store its particular signal. This memory circuit in conjunction with the restriction 26 minimizes the effect of short term variations in the process and prevents the control apparatus from over-correcting or giving false correcting signals. When the controller is comparing the primary feedback with the reference input for a particular zone the storage chamber for that zone is opened to the control circuits by the operation of a timing mechanism 28. When this occurs, the direct line between the memory circuit 19 and the restriction 26 instantly transmits the value of the stored signal. This signal is fed both to the controller 18, to the set point circuit 20 where it is used to determine the reference set point and to the final control element 21 for a particular heater.

The signal from the controller 18 after being integrated by the restriction 26 is combined with the specific zone signal from the memory circuit 19 and the new final control signal thus developed is transmitted to the final control element 21. Thus, in the absence of an error on any or all zones, the stored signal from the memory circuit for each zone will be the controlled output signal, and will continue to report for each casting wheel revolution the increase or decrease in heat for each zone. This element is activated by the signal and adjusts the heat in the appropriate zone to eliminate the sensed errors in thickness. The final control signal for a single heater can vary slightly while the storage chamber for that heater is open. As stated above, the stored signal is sent in three directions, one of which is to the final control element. When the scanning device finishes its measurement of that specific web segment, the corresponding storage chamber closes. Thus, the signal in the storage chamber can increase, decrease or remain the same.

Referring to the means 15 for measuring the total stretching force in the web, the sensed tension is sent from this means as a signal, i.e., the 2nd primary feedback. The signal is transmitted to a controller 22 and also may be kept on a recorder 27. This controller compares the 2nd primary feedback with a fixed set point; this set point is representative of the predetermined stretching force desired for the operation. The difference between the two signals is amplified and integrated with respect to time and then is transmitted to the final control element 21. Here the signal activates the part of the final control element that maintains the total heat input into the heaters without affecting the distribution of the heat in the various zones.

The final control element 21 must react to two separate but inter-related signals. This element must maintain the total heat applied to the web to sustain the desired stretching force in conjunction with distributing the heat over the various zones to eliminate thickness variations. In this operation the signal developed from the tension measurement 15 is used to determine the supply voltage to a bank of auto-transformers; one transformer for each zone scanned. The other signal from memory circuit 19 to the final contact element 21 represents the correcting signal for each zone that is sent to its appropriate auto-transformer with each one setting the heat in its particular zone.

FIGURE 2 shows the preferred embodiment of this invention, i.e., the use of pneumatic devices in developing the correcting signals. Pneumatic means are desirable since they have a low initial cost in comparison with equivalent electronic and hydraulic means and additionally they have a long useful life.

In this embodiment the heating unit contains fifteen strip heaters 13. The number of zones or heaters involved may vary, the only requirement is that there is a memory storage chamber and final control means for each heater. After the web has passed through the heating unit and has been stretched in the longitudinal direction, its thickness in a longitudinal zone is measured by an X-ray gauge 16 (Sheffield Model 25 PT).

This gauge senses the thickness in each zone for a period of time, the time for one casting wheel revolution could be used in order to average out longitudinal thickness variations. After sensing one zone, the gauge scans the other zones transversely across the web in a repeating sequence. The gauge will scan all fifteen zones and an additional scan period for calibration standardization in each cycle. The accuracy of an X-ray gauge is affected by many external factors, such as the surrounding temperature, dirt in the area, moisture in the air, breakdown of electrical filaments, etc. Because of these factors the gauge should be standardized for each cycle. To do this the gauge senses a known thickness sample 31 compares the signal developed for the sample with the correct signal in a multi-function relay 32 (Moore Products M/F Relay, Model 68V6) and if any error exists an X-ray zeroing servo-mechanism 33 corrects the gauge. During this calibration the remainder of the thickness control circuit is closed to the measuring means.

The electrical signal produced by the gauge has a magnitude that varies as a function of the thickness of the web and is transmitted to an electric to pneumatic transducer 34. For a description of such a pneumatic transducer see Bulletin 7701 published by Moore Products Co. of Philadelphia, Pa. This transducer produces a pneumatic primary feedback signal in the range of 3 to 15 p.s.i., such signal being compatible with most pneumatic control circuits.

The signal is then recorded at 17 (Moore Products Recorder, Model 5321–R) and sent to a proportional plus reset pneumatic controller 18. If desired, the recorder can be equipped with a second recording pen that can record one of several signals in the system, i.e., the set point signal, the memory circuit signal or the final control signal. This would be a benefit in discovering trouble in the system.

The controller, first, develops an actuating signal by comparing the primary feedback with the reference signal from the set point circuit, this latter signal is representative of the average web thickness correlated to the center of the action of the final control elements.

The set point circuit consists basically, of two equal one way flow valves 35 connected to two volume chambers 36 and 37. Within this circuit, chamber 37 in conjunction with flow valve 35 will assume the highest pressure in the entire system while chamber 36 will assume the lowest. The construction of this circuit allows the chambers to retain proper pressures and restricts the flow of high pressure from chamber 37 to the other chamber 36 through the equal needle valves 38.

At the junction 39 the pressure signal is equal to the average of the two pressures, i.e.

$$\frac{P_{high}+P_{low}}{2}$$

This signal will change as the average of the highest and lowest memory signals change, thus maintaining a signal corresponding to the midpoint. The signal pressure at 39 can then be set to an inverse derivative unit 40 (Moore Products Inverse Derivative, Model 59R) if it is necessary or desirable to reduce the effect of spurious signals and smooth out any rapid signal fluctuations. A description of the construction and operation of this type of unit may be found in U.S. Patents 2,431,297 and 2,501,957. A multi-function relay 41 (Moore Products M/F Relay, Model 68VT17) is used to compare this signal with a fixed reference force, such as a spring force; the fixed reference force representing the midpoint of travel of the final control elements. Thus the reference signal from relay 41 to controller 18 will drift up and down scale depending upon the average input into the relay. The relay also through the use of a fixed restriction, integrates the error signal with respect to time. After passing through this relay, the signal is then the reference output and is fed into the controller to represent the average web thickness and at the same time keep the final control elements centered within the limits of their travel.

The difference between the primary feedback and the reference input, if any, is then amplified within the controller. Thus, for a given deviation from set point, a portion of the controller output contains the deviation times a factor dependent upon the gain setting of the controller.

The feedback pressure for the particular zone being scanned is transmitted to the controller 18 through a 1:1 relay 42. It is algebraically added to the amplified difference between the primary feedback and the reference signal to determine the controller output. Thus, if no error exists for any particular zone, i.e., the difference between the primary feedback and the reference signal is zero. the output will equal the memory feedback and the memory will be sustained. The controller output signal is integrated with respect to time by the action of a needle valve restriction 26. The integrated signal is then combined with the signal stored in the memory chamber for the zone being scanned and is transmitted through the specific chamber to a 1:1 relay 43, and then to the final control element. Each memory chamber has a 1:1 relay (Moore Products Precision Booster 1:1 Ratio Relay) in order to maintain the pressure within the memory circuit while transmitting the combined signal output.

The memory system is an arrangement of a number of volume chambers 44, one for each zone, connected to a common manifold 45 through a series of micro-valves 46, one for each chamber. Each valve is actuated in sequence by a rotating cam assembly or some other suitable arrangement, i.e., miniature electronic solenoid valves in conjunction with a stepping relay, synchronized to the traverse movement of sensing means 16. As each part of the memory system is opened, the controller output signal for its particular zone is transmitted to it. The memory chambers must be bubble tight for proper operation and located such that they are not subject to rapid changes in temperature. The ratio of manifold volume to memory volume must be kept as small as possible to avoid line losses and interaction between memory chambers. Also, the cam and micro valve assembly must be adjusted so that there is no overlap between the opening and closing of memory chambers, otherwise there will be a transfer of pressure from one chamber to another that will adversely affect the over-all control performance. To isolate the manifold from the feedback circuit and the set point circuit, 1:1 relay 42 is used. This keeps the air volume of the manifold 45 as small as possible and maintains the pressure of the memory circuit.

The final control signals after being transmitted through 1:1 relays 43 are sent to pneumatic acuators or conomotors 47 (Conoflow Corp. Conomotor Variac Controller). These positioners compare the final control signal with a fixed spring force that represents the position of the piston in the conomotor. Any difference results in air being added to one side of the piston and this causes a movement of the piston. A description of the operation of the positioner of this type of unit may be found in U.S. Patent 2,653,578. The piston is connected to mechanical means for adjusting the setting of an auto-transformer 48. There is a pneumatic positioning actuator and an auto-transformer for each zone or heater. Thus the signal and resulting movement of the piston will determine the setting of the auto-transformer. The setting and the supply voltage furnished by the bus-bar 57 determine the amount of current that flows to each heater 13 which controls the amount of heat in each zone.

The total tension in the web is measured by an idler roll having hydraulic/pneumatic transmitting load cells 40 on each roll end. The web acts against the roll and each roll end senses part of the tension by the change in hydraulic pressure within the cell. This hydraulic pressure is transduced into a pneumatic signal by the hydraulic to pneumatic transducers 50 and sent to a totalizer 51 (Moore Products M/F Relay, Model 68WT23). The totalizer adds the two signals and produces a signal that equals the sum and is representative of the total tension in the web. This signal, i.e., the 2nd primary feedback, is sent to a recorder 26 (Moore Products MP Station 523MT4R) and then to a pneumatic proportional plus reset controller 22. This controller compares the 2nd primary feedback with a manually set signal representing the desired tension in the system. The controller then develops a correcting signal based on the difference plus a time integral of the difference between the two signals.

The controller output signal is transmitted through an inverse derivative unit 52 (Moore Products Inverse Derivative Model 59R) where the effect of spurious signals is reduced and the signal curve is smoothed out. The signal is then sent to a pneumatic positioning acuator or conomotor 53 that adjusts a variable resistor or rheostat 54 in a manner as previously explained. This rheostat is in a D.C. power supply circuit and it controls the D.C. current that is supplied to one winding in a saturable core reactor 55. Thus when the rheostat is set to a low value of resistance the amount of D.C. current into the D.C. windings of the reactor will approach the supply current. This high current causes the core to approach flux saturation and the A.C. current flowing through the A.C. winding in the reactor is not induced into the core. A higher value of resistance with conversely produce less core saturation, thus part of the A.C. current will be induced into the core.

The A.C. current that is not induced into the core is transmitted to the primary winding of a power transformer 56, thus the amount of A.C. current induced in the secondary is dependent upon the setting of the D.C. rheostat. The power induced in the secondary is sent to a bus-bar 57 that is connected to all the auto-transformers 48. Thus, the total amount of current into all the heaters is determined by the total tension in the web and the amount of the current that goes to each zone is determined by the thickness control circuit.

Once the system is in operation, either the total current input or the zone distribution of the current can be accomplished without adversely affecting the automatic control of the other. Because of the dynamics of the control system, the tension control circuit must be working on automatic control before the thickness control circuit can be used for automatic control. If the tension control circuit is not in automatic operation, the floating reference input of the thickness control circuit will drift to cause the extremes of the auto-transformer settings to be equally spaced about the center of travel and this may cause the tension setting to go off limits unless it, too, is on automatic control.

The means used to sense the thickness of the web is an X-ray gauge 16. This gauge has a sensitivity of better than 0.1% of the full scale, which is usually in the area of ±2 mils. There are several other methods of measuring the thickness of a moving web such as nuclear radiation, air gauge, air shoes, and roller contacts employing the use of linear differential transformers. The X-ray gauge was selected as it is easily adapted to scanning and provides a measurement without coming into contact with the web. A detailed description of the operation of this type of gauge may be found in U.S. Patent 2,549,402.

To sense the tension in the web, this embodiment uses a hydraulic/pneumatic system. The shaft on each end of the tension measuring roll is mounted in bearings that are located on top of hydraulic load cells 49. These load cells are force measuring devices and work on the principle that the hydraulic fluid in the system is retained at a fixed volume and that any hydraulic pressure produced is proportional to the force applied to the cell through the bearings. The hydraulic pressure in the load cell is sent through a capillary to a hydraulic/pneumatic transducer 50. The length of the capillary should be sufficient to dampen out signal noise. The transducer works on the principle of null balance of forces. Thus any change in the hydraulic pressure will act on hydraulic bellows or diaphragm in the transducer and will produce a pneumatic balancing pressure that is equal and opposite to the force of the hydraulic member. The hydraulic load cells and hydraulic/pneumatic transducers can be obtained as a unit from the A.H. Emery Company, New Canaan, Conn.

In both the calibration circuit for the X-ray gauge and the set point circuit, multi-function relays 32 and 41 are used. This type of relay compares a pneumatic signal with a set force, such as produced by a manually set spring. A detailed description of the construction and operation of this type of relay may be found in U.S. Patents 2,312,201 and 2,359,236.

A controller that can be used in the thickness control circuit is the Moore Products Nullmatic 56MF after having been modified to reduce the overall volume of the reset reference chamber to an infinitesimal amount to permit a rapid equalization of pressures within the controller during the time each wheel segment is being examined. To modify this controller the reset needle valve is removed and the connection is plugged, the volume of the reset-reference chamber is greatly reduced by a plug filler and the feedback is fed into the reduced chamber by tapping in a connection. A description of this controller and its operation may be found in Instruction Book, SD50-3 entitled "Nullmatic Controller" published by Moore Products Co., Philadelphia, Pa., and copyrighted in 1958, or in the following U.S. Patents 2,3,12,201, 2,359,236, 2,518,244, and 2,520,468. A restriction 26 (Hoke Inc. Calibrated Restriction) is added to the controller output circuit which integrates the controller output signal with respect to time. The elimination of reset or integrating-action within the controller by the mentioned modifications provides for a fast speed of response for scanning a multiple of process variables, and a simple circuit is achieved with only one controller.

A controller that can be used in the tension control circuit 22 is the Moore Products Nullmatic, Model 50M. A description of this controller and its operation may be found in Instruction Book SD50-3, entitled "Nullmatic Controller" published by Moore Products Co., Philadelphia Pa., copyright 1958, or in the following U.S. Patents 2,312,201, 2,359,236, 2,518,244, and 2,520,468.

In the thickness control circuit, the correcting or control signals are sent to pneumatic positioning actuators 47. These actuators by use of a rack and pinion mechanism produce a proportional rotary motion to accurately position the variable transformer arms of auto-transformers 48. These auto-transformers vary the power input into the heaters by having a variable output voltage. The Variac auto-transformer, manufactured by General Radio Company, West Concord, Mass., which is constructed of a single winding or a toroidal iron core with a carbon brush contact, can be used. In the tension control circuit the correcting signal is sent to a pneumatic actuator 53 that by the use of a rack and pinion mechanism positions a rheostat 54.

FIG. 3 discloses an alternate embodiment of the invention utilizing electronic devices instead of pneumatic. In this embodiment the thickness in the various zones is sensed by an electrical means such as an X-ray gauge 16. The manner of operation of the sensing means is the same as previously explained. The gauge is standardized by a servo-mechanism 60 and its voltage output is increased in amplifier 61 until it has a range of 0±100 volts D.C., such voltage being compatible with the remaining units in the electronic circuit. The output voltage which varies in proportion to the magnitude of the thickness, can then be sent to a D.C. potentiometer-recorder 62 where a graphic record is made.

The thickness voltage or primary feedback is then received by a summer 63 where it is compared with a reference signal voltage to develop an error or difference voltage. The manner in which the reference voltage is developed will be explained later. The summer can be any of many electronic devices that produce an output voltage representing the difference between two input voltages. If the thickness (primary feedback) voltage equals the reference voltage, indicating no error in the thickness of the web, the input to the operational amplifier 64 will be zero.

Any error is then received by a stabilized operational amplifier 64, wherein the error voltage is amplified. This amplifier has proportional response and the gain is determined by the setting of the potentiometer $R_1$ and is of the ratio of $R_1/R_2$. The amplified voltage is then integrated with respect to time in an integrating circuit 65. This circuit also contains the memory means, which consists of fifteen capacitors, one for each zone. Each capacitor stores the prior computed voltage signal for its zone just as the volume chambers do in the pneumatic embodiment. A stepping relay 66 synchronized with the scanning of the various zones connects the capacitor for a particular zone into the integration circuit 65 while the thickness of that particular segment is being measured by the sensing means 16.

The output of the integration circuit is in the same operational form as the pneumatic signal sent to the pneumatic positioning actuators 47. This controller output signal voltage is then compared in a summer 67 with a signal voltage that represents the reference setting of the autotransformer 48 for the particular zone being scanned. The development of the auto-transformer signal voltage and its synchronization to the particular zone being scanned will be explained later.

The difference between the integration circuit signal and reference setting fed into the summer 67 is transmitted to a chopper-amplifier 68 and its output, transmitted by the stepping relay, 66, is the power input that is used to operate one of the fifteen reversible A.C. motors 69. The one chopper-amplifier acts on the differential voltage from the summer 67 for every zone and the voltage for the particular zone being scanned is transmitted from the chopper-amplifier to the appropriate motor 69 by the stepping relay 66.

The movement of each reversible motor is mechanically linked by a shaft and gear reducing means to a plurality of auto-transformers 48, one for each zone or heater. The movement of the motor thus determines the setting of the auto-transformer and will control the amount of heat in each zone or heat distribution as explained in the pneumatic embodiment.

The movement of each reversible motor is also mechanically linked by the same shaft to a feedback potentiometer 70. These potentiometers produce a voltage that is a function of their corresponding auto-transformer settings and this voltage is connected by the synchronized stepping relay 66 to the summer 67 where it is compared with the differential controller output voltage as previously explained. Thus if the controller output voltage equals the potentiometer (or auto-transformer) voltage, no correcting voltage will be produced to operate motor 69. This indicates that the amount of heat in the particular zone is correct and the setting of the auto-transformer will not be changed.

The reference input voltage sent to summer 63 to be compared with the primary feedback serves two purposes. The first is to represent an average of the web thickness for a basis of comparison when measuring the thickness in any particular zone. The second is to keep the extremes of the auto-transformer settings equally spaced about the center of travel.

The reference input voltage is developed in a set point circuit 71. Within this circuit a capacitor $C_{16}$ in conjunction with a diode assumes the highest voltage in the system, while capacitor $C_{17}$ in conjunction with another diode assumes the lowest voltage. These voltages pass through equal resistances $R_4$ and $R_5$ and at the juncture, the voltage is equal to the average of the two. This voltage will change as the average of the highest and lowest voltages changes thus maintaining a signal from the set point circuit which corresponds to the midpoint voltage.

This signal can be sent to a summer 72 where it is compared with a manually set voltage that represents the midpoint of an auto-transformer setting. In applications where this manually set voltage would equal zero, this summer may be omitted.

The difference in the voltages is then acted on by a conventional electronic proportional-integral controller composed of an operational amplifier 73. The output of this controller which is the amplified plus the integrated difference voltages is then the reference input and is compared with the primary feedback as previously explained.

The stepping relay 66 is a one shaft, three level relay. The shaft is synchronized to the scanning of the X-ray gauge and the revolutions of the casting wheel by appropriate means (not shown) and the first level opens the memory capacitor for the particular zone being scanned to the integrating circuit 65. The second level synchronizes the voltage from the feedback potentiometer 70 for the zone being scanned with the computed voltage for that zone. The third level synchronizes the output of the chopper-amplifier 68 for the zone being scanned to the motor and other final control means that set the heat for that zone. Thus with one stepping relay, while the measuring means is sensing the thickness in zone 1, the capacitor for zone 1 is connected to the integrating circuit 65, the chopper-amplifier is connected to the A.C. motor that sets the auto-transformer for zone 1 and the feedback potentiometer for zone 1 is connected to the summer 67 where the voltages from the integrated circuit and potentiometer for zone 1 are compared.

The total tension in the web is measured by appropriate means, such as hydraulic load cells, 49, or electrical resistance strain gauges. If an electronic sensing means is used the output may have to pass through an amplifier (not shown) so that the appropriate range of $0\pm100$ volts can be obtained. If hydraulic or pneumatic means are used, the output from each load cell may have to be totalized 51 and the signal representing the total tension will have to be converted to an electrical voltage of the appropriate range in a transducer 74. The output voltage can then be sent to a potentiometer-recorder 75 where a graphic record is prepared.

The tension voltage or 2nd primary feedback is then received by a summer 76 where it is compared with a reference signal voltage to develop an error or differential voltage. The reference voltage is manually set from a standard constant signal means 82 and it is representative of the desired tension in the web.

Any error voltage is then received by a stabilized operational amplifier 77. The output of the amplifier which is the error voltage amplified and integrated with respect to time, is then compared in another summer 78 with potentiometer feedback voltage. This feedback voltage represents the setting of the rheostat 54 and is developed by the feedback potentiometer 80 in a manner as previously explained for potentiometers 79.

The difference between the two input voltages to the summer 78 is transmitted to a chopper-amplifier 79. The output of this chopper-amplifier is used to operate a reversible A.C. motor 81. The movement of the motor 81 is mechanically linked to the feedback potentiometer 80 and a rheostat 54. Thus the movement of the motor sets the rheostat and the potentiometer. The rheostat setting determines the total amount of heat in all the zones or heaters as previously explained in the pneumatic embodiment.

The invention has many advantages over the prior art and one is a reduction in the time required to correct a process upset. This system has little or no dead time and will operate effectively when the process upsets occur in the nature of gradual drifts. Another advantage is that the invention can control a number of inter-related process variables with stabilized over-all control. The storage capacity and related circuitry of the apparatus of the invention minimize the effect of short-term deviations, which have an upsetting effect on the control of the process. Additionally, the use of the moving web's average thickness as the reference input enables the attainment of a more uniform web than with controllers which utilize a preselected, set-point reference. This invention, when used on an appropriate process will result in improved process operability and improved product uniformity.

What is claimed is:
1. A process for preparing a web which comprises
   (A) casting said web;
   (B) stretching said web while heat is being applied to said web by a plurality of heaters;
   (C) measuring the web tension during said stretching;
   (D) detecting said web thickness after said stretching by periodically measuring the thickness of traverse segments of said web;
   (E) changing the output of all of said heaters to produce a desired tension on said web;
   (F) forming a signal by comparing a signal for the thickness of said traverse segments with a reference signal;
   (G) changing the output of individual heaters of said plurality in response to said comparison signal; and
   (H) removing said stretched web upon a windup reel.

2. An apparatus for preparing a web comprising
(A) means for stretching said web;
(B) heating means having a plurality of heaters for softening said web;
(C) tension control means for measuring said web tension as it is stretched and signalling any difference in a comparison of said measurement with a signal for the desired web tension;
(D) a web thickness detector for repeatedly scanning across said web by segments, said segments corresponding to a portion of the web width being effected by one of said heaters;
(E) control means responsive to a signal from said thickness detector for a designated web segment whereby said control compares said signal with a reference signal to form a correction signal for said designated web segment; and
(F) actuating means for said heaters whereby a signal from said tension means will uniformly change the output of all of said heaters and a signal from said control means will change the output of only said heater corresponding to said web segment being measured.

3. An apparatus as defined in claim 2 where said stretching means is two pair of rolls maintained at a designated rotational speed differential.

4. An apparatus as defined in claim 2 where said heating means is a plurality of radiant heaters arranged side by side above the web, each heater being in a position longitudinal to the direction of web travel.

5. An apparatus for preparing a web comprising
(A) web forming means;
(B) means for stretching said web;
(C) heating means having a plurality of heaters for softening said web said means being located near said web;
(D) tension measuring means for measuring said web tension as it is stretched and signalling any difference in a comparison of said measurement with a fixed signal;
(E) a web thickness detector for scanning in a cyclic pattern across said web while measuring the thickness of segments of said web;
(F) control means responsive to a signal from said thickness detector for a designated web segment whereby said control compares said signal with a reference signal to form a correction signal for said designated web segment;
(G) actuating means for said heaters whereby a signal from said tension means will uniformly change the output of all of said heaters and a signal from said control means will change the output of only said heater corresponding to said web segment being measured; and
(H) windup means for retrieving said web.

6. In an apparatus for preparing a web having web forming means for shaping said web and a windup roll to receive said web the improvement which comprises placing before said windup means
(A) means for stretching said material;
(B) heating means having a plurality of heaters for softening said web;
(C) tension control means for measuring said web tension as it is stretched and signalling any difference in a comparison of said measurement with a signal for the desired web tension;
(D) a web thickness detector for repeatedly scanning across said web by segments, said segments corresponding to a portion of the web width being effected by one of said heaters;
(E) control means responsive to a signal from said thickness detector for a designated web segment whereby said control compares said signal with a reference signal to form a correction signal for said designated web segment; and
(F) actuating means for said heaters whereby a signal from said tension means will uniformly change the output of all of said heaters and a signal from said control means will change the output of only said heater corresponding to said web segment being measured.

7. An apparatus for preparing a web comprising
(A) two pair of stretching rolls;
(B) a plurality of radiant heaters located between said pairs of rolls and arranged side by side above said web, each heater being in a position longitudinal to the direction of web travel;
(C) a pressure sensitive tension measuring device for measuring web tension between said two pair of rolls;
(D) a web thickness detector for scanning in a cyclic pattern across said web while measuring the thickness of segments of said web;
(E) control means responsive to a signal from said thickness detector for a designated web segment whereby said control compares said signal with a reference signal to form a correction signal for said designated web segment; and
(F) actuating means for said heaters whereby a signal from said tension means will uniformly change the output of all of said heaters and a signal from said control means will change the output of only said heater corresponding to said web segment being measured.

References Cited

UNITED STATES PATENTS

| | | |
|---|---|---|
| 2,909,660 | 10/1954 | Alexander. |
| 3,000,438 | 9/1961 | Alexander 162—259 |
| 3,122,783 | 3/1964 | Jolliffe et al. 18—2 |
| 3,307,215 | 3/1967 | Gerhard et al. 18—2 |

ALEXANDER H. BRODMERKEL, *Primary Examiner.*

P. E. ANDERSON, *Assistant Examiner.*